UNITED STATES PATENT OFFICE.

HENRY A. DANIELS, OF YONKERS, NEW YORK.

ARTIFICIAL STONE.

SPECIFICATION forming part of Letters Patent No. 346,730, dated August 3, 1886.

Application filed January 15, 1886. Serial No. 188,674. (No specimens.)

*To all whom it may concern:*

Be it known that I, HENRY A. DANIELS, a citizen of the United States, and a resident of Yonkers, in the county of Westchester and State of New York, have invented certain new and useful Improvements in Artificial Stone, of which the following is a specification.

In a separate application for Letters Patent I have described an artificial stone composition consisting of sand, cement, and a binding material—as caoutchouc—which composition is made into a paste and hardened, and constitutes an artificial stone adapted for use for many purposes.

My present invention consists of an artificial stone in which the ingredients above named are combined with potash or pearlash, and in some instances with alum, and, when desired, with any suitable coloring-matter, according to the color or tint which it is desired to impart to the stone. By the addition of pearlash or potash, or equivalent alkali, to the composition of sand and cement, I effect a partial solution and crystallization of the silica in the said composition, so that the resultant stone is harder and has more of a crystalline character than would otherwise result, and by the addition of alum to the composition, when glue is employed as a binding material, I render the said glue hard and insoluble, so as to make a composition better fitted for outside work than when the glue is used without the alum.

In the manufacture of the artificial stone I use the sand and cement in suitable proportions—say, for instance, ten pounds of sand, five pounds of cement, one-fourth of a pound of glue, gum, or caoutchouc to each gallon of liquid in which it is dissolved—and add one-quarter of a pound of the alkali to each gallon of the solution, and mix the latter with the sand and cement until a paste of proper consistency is formed. This paste is then molded or spread with a trowel or otherwise applied, and when it sets and dries will form a hard, durable block or coating.

When any coloring material is used it is mixed with the cement.

Although I have specified the proportions which I have found most practicable, the said proportions may in some instances be varied.

I am aware that friable gums—as shellac—have been used in stone compositions, and do not claim, broadly, the use of gum as a binding material; but I use soft elastic binding matter—as caoutchouc or glue—which will not pulverize and crumble away.

Without limiting myself to the precise proportion of ingredients specified, I claim—

1. An artificial stone consisting of sand, cement, a non-friable binding material—as caoutchouc—and an alkali—as pearlash—combined substantially as set forth.

2. A composition for artificial stones, consisting of sand and cement, a non-friable binding material—as caoutchouc—and an alkali—as pearlash—in solution, substantially as described.

In testimony whereof I have signed my name to this specification in the presence of two subscribing witnesses.

HENRY A. DANIELS.

Witnesses:
    HARRY M. DICKINSON,
    H. P. STAMFORD.